US006920151B1

(12) United States Patent
Baker et al.

(10) Patent No.: US 6,920,151 B1
(45) Date of Patent: Jul. 19, 2005

(54) SYMBOL-BASED CONTROL OF TERMINAL ENDPOINTS IN A COMMUNICATION SYSTEM

(75) Inventors: Albert D. Baker, Lincroft, NJ (US); James Cheng-Pin Liu, Holmdel, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/272,958

(22) Filed: Mar. 19, 1999

(51) Int. Cl.[7] .................................................. H04J 3/24
(52) U.S. Cl. ...................................... 370/466; 370/474
(58) Field of Search ................................ 370/389, 392, 370/395.2, 395.3, 395.52, 465, 466, 468, 469, 470, 471, 473, 474, 475, 329, 338, 349

(56) References Cited

U.S. PATENT DOCUMENTS

| | | | | | |
|---|---|---|---|---|---|
| 4,397,030 | A | * | 8/1983 | Becker et al. | 375/257 |
| 5,406,550 | A | * | 4/1995 | McTiffin | 370/335 |
| 5,615,210 | A | * | 3/1997 | Kaiyama et al. | 370/389 |
| 5,655,215 | A | * | 8/1997 | Diachina et al. | 455/426 |
| 5,717,737 | A | * | 2/1998 | Doviak et al. | 370/338 |
| 6,075,789 | A | * | 6/2000 | Kasslin et al. | 370/338 |
| 6,198,728 | B1 | * | 3/2001 | Hulyalkar et al. | 370/280 |
| 6,198,920 | B1 | * | 3/2001 | Doviak et al. | 455/426 |
| 6,272,148 | B1 | * | 8/2001 | Takagi et al. | 370/469 |

FOREIGN PATENT DOCUMENTS

| | | | | |
|---|---|---|---|---|
| FI | WO 97/02670 | * | 1/1997 | H04H/1/00 |

OTHER PUBLICATIONS

DEFINITY® Enterprise Communications Server, Release 6, Administration and Feature Description, "Bridged Call Appearance," pp. 4–109 to 4–124, Aug. 1997.
DEFINITY® Enterprise Communications Server, Release 6, Administration and Feature Description, "Terminal Translation Initialization," pp. 4–562 to 4–569, Aug. 1997.

\* cited by examiner

*Primary Examiner*—Kwang Bin Yao
(74) *Attorney, Agent, or Firm*—Ryan, Mason & Lewis, LLP

(57) ABSTRACT

A wireless terminal or other type of terminal in a communication system is controlled in a bandwidth-efficient manner using commands associated with a terminal protocol supported by a switch of the system. In an illustrative embodiment, a set of command symbols are generated by: (i) resizing a command space associated with a wired terminal protocol to obtain a reduced command space suitable for use with a wireless terminal; (ii) generating a representation in which a first portion of the reduced command space is correlated with a second portion of the reduced command space; and (iii) assigning command symbols to valid entries in the representation, such that a given one of the command symbols uniquely identifies a particular combination of commands in the reduced command space. The switch transmits a given command symbol to the wireless terminal, and the wireless terminal decodes the symbol and executes the corresponding commands specified by the symbol. Since the command symbols can be represented using significantly fewer bits than would otherwise be required using the complete wired terminal protocol, the invention allows the switch to control the wireless terminal in a bandwidth-efficient manner, while still providing substantially the full functionality of the wired terminal protocol at the wireless terminal.

26 Claims, 5 Drawing Sheets

FIG. 4

| VALUES (B5:B8) | OFF HOOK (B1 = 0) | | | | | | | | ON HOOK (B1 = 1) | | | | | | | |
|---|---|---|---|---|---|---|---|---|---|---|---|---|---|---|---|---|
| | TEST OFF (B2 = 0) | | | | TEST ON (B2 = 1) | | | | TEST OFF (B2 = 0) | | | | TEST ON (B2 = 1) | | | |
| | CATEGORY (B3:B4) | | | | CATEGORY (B3:B4) | | | | CATEGORY (B3:B4) | | | | CATEGORY (B3:B4) | | | |
| | 00 | 01 | 10 | 11 | 00 | 01 | 10 | 11 | 00 | 01 | 10 | 11 | 00 | 01 | 10 | 11 |
| 0000 | 1 | 16 | 18 | 29 | ▨ | ▨ | ▨ | ▨ | 41 | 56 | 64 | 75 | 87 | ▨ | ▨ | ▨ |
| 0001 | 2 | ▨ | 19 | 30 | ▨ | ▨ | ▨ | ▨ | 42 | 57 | 65 | 76 | 88 | ▨ | ▨ | ▨ |
| 0010 | 3 | ▨ | 20 | 31 | ▨ | ▨ | ▨ | ▨ | 43 | 58 | 66 | 77 | 89 | ▨ | ▨ | ▨ |
| 0011 | ▨ | ▨ | 21 | 32 | ▨ | ▨ | ▨ | ▨ | ▨ | 59 | 67 | 78 | ▨ | ▨ | ▨ | ▨ |
| 0100 | 4 | ▨ | 22 | 33 | ▨ | ▨ | ▨ | ▨ | 44 | 60 | 68 | 79 | 90 | ▨ | ▨ | ▨ |
| 0101 | 5 | ▨ | 23 | 34 | ▨ | ▨ | ▨ | ▨ | 45 | 61 | 69 | 80 | 91 | ▨ | ▨ | ▨ |
| 0110 | 6 | 17 | 24 | 35 | ▨ | ▨ | ▨ | ▨ | 46 | 62 | 70 | 81 | 92 | ▨ | ▨ | ▨ |
| 0111 | 7 | ▨ | 25 | 36 | ▨ | ▨ | ▨ | ▨ | 47 | 63 | 71 | 82 | 93 | ▨ | ▨ | ▨ |
| 1000 | 8 | ▨ | 26 | 37 | ▨ | ▨ | ▨ | ▨ | 48 | ▨ | 72 | 83 | 94 | 102 | ▨ | ▨ |
| 1001 | 9 | ▨ | 27 | 38 | ▨ | ▨ | ▨ | ▨ | 49 | ▨ | 73 | 84 | 95 | ▨ | ▨ | ▨ |
| 1010 | 10 | ▨ | 28 | 39 | ▨ | ▨ | ▨ | ▨ | 50 | ▨ | 74 | 85 | 96 | ▨ | 103 | ▨ |
| 1011 | 11 | ▨ | ▨ | 40 | ▨ | ▨ | ▨ | ▨ | 51 | ▨ | ▨ | 86 | 97 | ▨ | ▨ | ▨ |
| 1100 | 12 | ▨ | ▨ | ▨ | ▨ | ▨ | ▨ | ▨ | 52 | ▨ | ▨ | ▨ | 98 | ▨ | ▨ | ▨ |
| 1101 | 13 | ▨ | ▨ | ▨ | ▨ | ▨ | ▨ | ▨ | 53 | ▨ | ▨ | ▨ | 99 | ▨ | ▨ | ▨ |
| 1110 | 14 | ▨ | ▨ | ▨ | ▨ | ▨ | ▨ | ▨ | 54 | ▨ | ▨ | ▨ | 100 | ▨ | ▨ | ▨ |
| 1111 | 15 | ▨ | ▨ | ▨ | ▨ | ▨ | ▨ | ▨ | 55 | ▨ | ▨ | ▨ | 101 | ▨ | ▨ | ▨ |

FIG. 5A

| B1: PSH, PRIMARY SWITCH HOOK STATE ||
|---|---|
| B1 | PRIMARY SWITCH HOOK STATE |
| 0 | OFF |
| 1 | ON |

FIG. 5B

| B2: TST, TEST OPERATION ||
|---|---|
| B2 | TEST OPERATION |
| 0 | OFF |
| 1 | ON |

FIG. 5C

| B3-B4: POINTER: CATEGORY OF APPLICATION |||
|---|---|---|
| B3 | B4 | APPLICATION |
| 0 | 0 | VISUAL INDICATOR |
| 0 | 1 | AUDIO ALERTER |
| 1 | 0 | DISPLAY PRE-DETERMINED STRING |
| 1 | 1 | DISPLAY DATA STRING |

FIG. 5D

| B5-B8: VISUAL INDICATOR |||
|---|---|---|
| B5 | B6 | INDICATOR ID |
| 0 | 0 | ICON |
| 0 | 1 | LED 1 |
| 1 | 0 | LED 2 |
| 1 | 1 | LED 3 |

| B7 | B8 | ATTRIBUTES |
|---|---|---|
| 0 | 0 | OFF (LED & ICON) |
| 0 | 1 | ON (LED & ICON) |
| 1 | 0 | REVERSE VIDEO (ICON) FLASH (LED) |
| 1 | 1 | FAST BLINK (LED) |

FIG. 5E

| B5 | B6 | B7 | B8 | B5–B8: AUDIO ALERTER / ALERTING PATTERN |
|---|---|---|---|---|
| 0 | 0 | 0 | 0 | ALERT OFF |
| 0 | 0 | 0 | 1 | PATTERN 1 |
| 0 | 0 | 1 | 0 | PATTERN 2 |
| 0 | 0 | 1 | 1 | PATTERN 3 |
| 0 | 1 | 0 | 0 | PATTERN 4 |
| 0 | 1 | 0 | 1 | PATTERN 5 |
| 0 | 1 | 1 | 0 | CALL WAITING PATTERN |
| 0 | 1 | 1 | 1 | TEST PATTERN |
| 1 | 0 | 0 | 0 | NOT USED |
| 1 | 0 | 0 | 1 | NOT USED |
| 1 | 0 | 1 | 0 | NOT USED |
| 1 | 0 | 1 | 1 | NOT USED |
| 1 | 1 | 0 | 0 | NOT USED |
| 1 | 1 | 0 | 1 | NOT USED |
| 1 | 1 | 1 | 0 | NOT USED |
| 1 | 1 | 1 | 1 | NOT USED |

FIG. 5F

| B5 | B6 | B7 | B8 | B5–B8: DISPLAY PRE-DETERMINED STRING / PRE-DETERMINED DISPLAY STRING |
|---|---|---|---|---|
| 0 | 0 | 0 | 0 | CLEAR DISPLAY |
| 0 | 0 | 0 | 1 | DISPLAY STRING 1 |
| 0 | 0 | 1 | 0 | DISPLAY STRING 2 |
| 0 | 0 | 1 | 1 | DISPLAY STRING 3 |
| 0 | 1 | 0 | 0 | DISPLAY STRING 4 |
| 0 | 1 | 0 | 1 | DISPLAY STRING 5 |
| 0 | 1 | 1 | 0 | DISPLAY STRING 6 |
| 0 | 1 | 1 | 1 | DISPLAY STRING 7 |
| 1 | 0 | 0 | 0 | DISPLAY STRING 8 |
| 1 | 0 | 0 | 1 | LOAD DISPLAY STRING |
| 1 | 0 | 1 | 0 | DISPLAY TEST STRING |
| 1 | 0 | 1 | 1 | NOT USED |
| 1 | 1 | 0 | 0 | NOT USED |
| 1 | 1 | 0 | 1 | NOT USED |
| 1 | 1 | 1 | 0 | NOT USED |
| 1 | 1 | 1 | 1 | NOT USED |

FIG. 5G

| B5 | B6 | B7 | B8 | B5–B8: DISPLAY DATA STRING / DISPLAY CHARACTER |
|---|---|---|---|---|
| 0 | 0 | 0 | 0 | (RESERVED) |
| 0 | 0 | 0 | 1 | CHARACTER 1 |
| 0 | 0 | 1 | 0 | CHARACTER 2 |
| 0 | 0 | 1 | 1 | CHARACTER 3 |
| 0 | 1 | 0 | 0 | CHARACTER 4 |
| 0 | 1 | 0 | 1 | CHARACTER 5 |
| 0 | 1 | 1 | 0 | CHARACTER 6 |
| 0 | 1 | 1 | 1 | CHARACTER 7 |
| 1 | 0 | 0 | 0 | CHARACTER 8 |
| 1 | 0 | 0 | 1 | CHARACTER 9 |
| 1 | 0 | 1 | 0 | CHARACTER 0 |
| 1 | 0 | 1 | 1 | (SPACE) |
| 1 | 1 | 0 | 0 | NOT USED |
| 1 | 1 | 0 | 1 | NOT USED |
| 1 | 1 | 1 | 0 | NOT USED |
| 1 | 1 | 1 | 1 | NOT USED |

SYMBOL-BASED CONTROL OF TERMINAL ENDPOINTS IN A COMMUNICATION SYSTEM

FIELD OF THE INVENTION

The invention relates generally to communication systems, and more particularly to communication systems which support wireless mobile telephones or other types of wireless user terminals.

BACKGROUND OF THE INVENTION

Communication system switches frequently deploy multifunction voice or voice-and-data terminals which generally require a complex multi-octet terminal protocol to drive the terminal interface and to control transport services. Such a multi-octet protocol is typically field oriented, and may include, e.g., a header field, a command pointer field, a command data field interpreted according to the contents of the command pointer, and an integrity check field. Each field is usually defined as a collection of one or more bits, and certain bits or collections of bits are dedicated to certain functions. This creates fixed relationships between bits and command interpretations. In addition, the deskset terminal design is such that a large number of bits are assigned or reserved for numerous feature keys and feature indicator controls. When such a system is upgraded to support wireless terminals, use of the existing wired terminal protocol is desirable from a switch software point of view, since re-use of the protocol is generally a low-cost implementation. Unfortunately, this conventional approach requires excessive bandwidth, and fails to optimize the control protocol for the wireless voice terminal.

There are a number of issues associated with use of an existing wired terminal protocol to support wireless terminals. For example, the wireless terminal by its very nature is designed to be small and easily portable. The direct consequence of this is that there is an extremely limited area on the terminal user interface for feature access presentation. This implies that the wireless terminal control protocol requires many fewer codepoints for feature button and associated feature indicator pairs. Further, the area for a switch-controlled display on the wireless unit may be much smaller, and therefore only a subset of the normative wired terminal display control functionality is required to support the wireless terminal. In addition, a significant portion of the information displayed by a wireless terminal relates to the condition of the terminal itself, e.g., battery charge remaining, signal strength, etc., and is not commanded by the switch. Conventional techniques for utilizing a wired terminal protocol to support wireless terminals have failed to adequately address these and other important issues, and as a result these techniques suffer from the above-noted problems of excessive bandwidth consumption and lack of optimization.

A need therefore exists for techniques which allow an existing wired terminal protocol to be custom-fit to a wireless terminal interface, in order to capitalize on the existing switch software codebase, to reduce the amount of bandwidth consumed for terminal control, and to preserve the functionality of the system as represented to the user via the wireless terminal.

SUMMARY OF THE INVENTION

The invention allows a switch or other communication system device to direct a system terminal to perform a set of command-based operations using a compressed symbol-based command format. The format in an illustrative embodiment is the result of cross-coding a collection of individual commands from an existing wired terminal protocol into a bandwidth-efficient set of command symbols, such that a particular combination of multiple wireless terminal commands are executed upon the transmission of a given symbol from a commanding switch. In other words, a given transmitted symbol is interpreted by the wireless terminal as corresponding to the particular combination of commands in the wired terminal protocol. The invention is not restricted to use in applications in which a wired terminal protocol is supported by a wireless terminal, as in the illustrative embodiment, but is instead more broadly applicable to any application in which an existing terminal protocol is used to support a terminal having a valid command space which is less than the full available command space of the terminal protocol.

In the illustrative embodiment, the set of command symbols may be generated by: (i) resizing a command space associated with the wired terminal protocol to obtain a reduced command space suitable for use with the wireless terminal; (ii) generating a tabular representation in which specific bit values from a first portion of the reduced command space correspond to columns and specific bit values from a second portion of the reduced command space correspond to rows; and (iii) assigning command symbols to valid entries in the tabular representation, such that a given one of the command symbols uniquely identifies a particular combination of commands in the reduced command space. In operation, the switch transmits a given command symbol to the wireless terminal, and the wireless terminal decodes the symbol and executes the corresponding commands specified by the symbol. Similar techniques may be used for terminal-to-switch communications in accordance with the invention.

The above-described illustrative embodiment of the invention significantly reduces the command field associated with supporting the operation of a wireless terminal using an existing wired terminal protocol. This results in a proportional bandwidth consumption reduction when communicating over wireless communication channels, thereby preserving this scarce resource. The full functionality of the system, as expressed by the wired terminal protocol, is made available to the wireless terminal to the extent implementable in that terminal. In addition, there is no need to subject the command symbols to bitwise encryption, since their field mapping conventions in accordance with the wired terminal protocol are eliminated during the symbol generation process of the invention. These and other features and advantages of the present invention will become more apparent from the accompanying drawings and the following detailed description.

BRIEF DESCRIPTION OF THE DRAWINGS

FIG. 4 is a table illustrating symbol generation in an illustrative embodiment of the invention.

FIGS. 5A through 5G are tables illustrating field-based commands and associated parameters of the wireless terminal, after resizing of the command space associated with the wired terminal protocol.

DETAILED DESCRIPTION OF THE INVENTION

The invention will be illustrated below in conjunction with an exemplary wireless communication system. Although particularly well-suited for use with, e.g., a telephone system which supports both wired deskset terminals and wireless terminals, the invention is not limited to use with any particular type of system or terminal. The disclosed techniques may be used in any communication application in which it is desirable to utilize a given terminal protocol to provide bandwidth-efficient support of a terminal which uses less than the full available command space of the terminal protocol. For example, the invention may be applied to handsets for use in cellular and personal communication services (PCS) systems, and to other types of communication terminals, such as wired ISDN terminals. The word "terminal" as used herein should therefore be understood to include not only portable wireless handsets as in the illustrative embodiment, but also other types of communication devices, including personal computers, wired and wireless desksets, optical communication terminals, or any terminal supported by a message-oriented command structure. It should be noted that the invention does not require any particular type of information transport medium, i.e., the invention may be implemented with any desired transport type. The term "switch" as used herein should be understood to include enterprise switches and other types of telecommunication switches, as well as other types of processor-based communication control devices such as servers, computers, adjuncts, etc. The term "table" as used herein is intended to include not only tabular representations as in the illustrative embodiments, but any other type and arrangement of data from which information can be extracted using one or more identifiers. For example, information stored in an addressable memory may be viewed as an example of one type of table.

Figure 1:
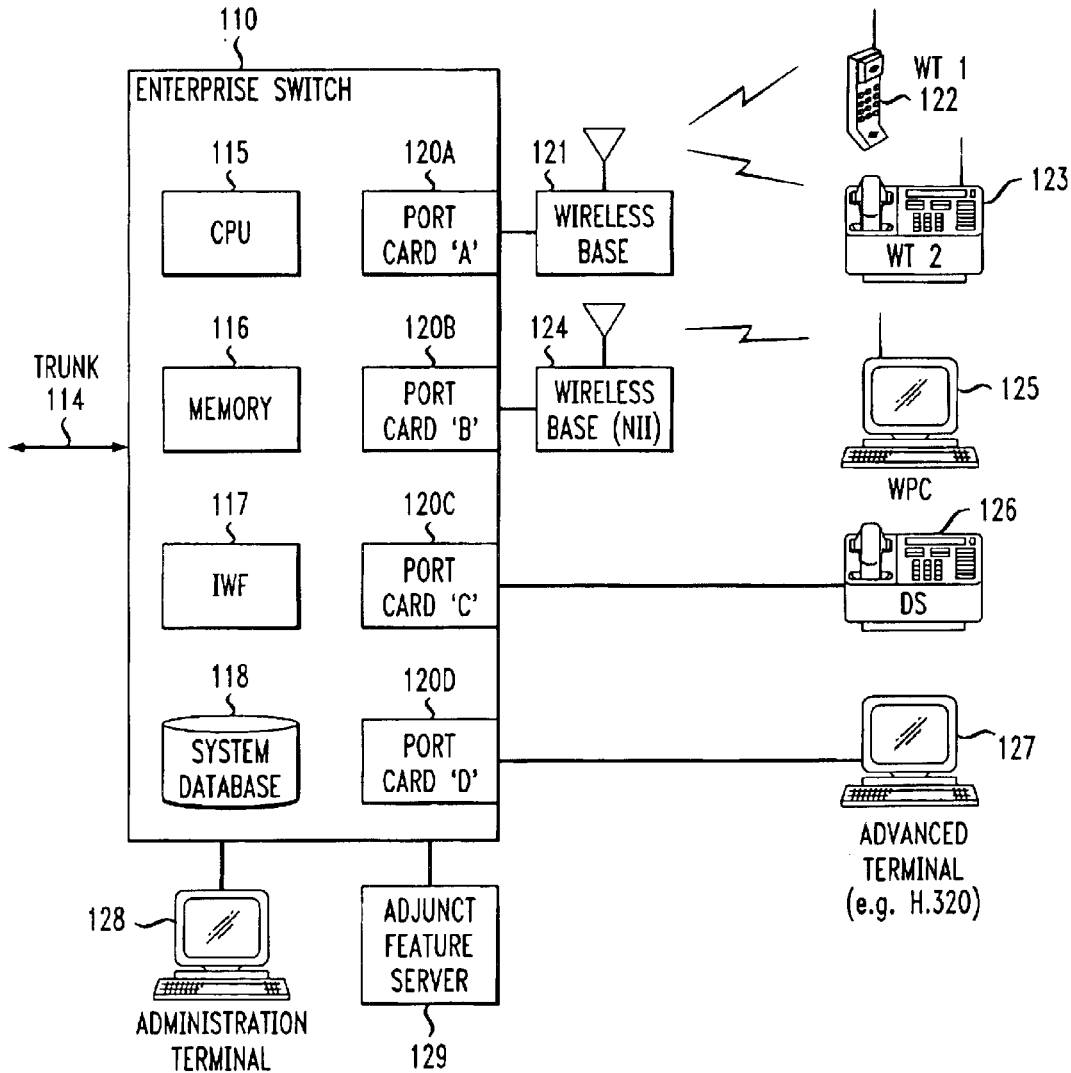
FIG. 1 shows a portion of an exemplary communication system in which the invention may be implemented.

FIG. 1 shows a portion of an exemplary communication system 100 in which the invention may be implemented. The system 100 includes an enterprise switch 110 which receives as an input a trunk 114. The trunk 114 supplies incoming calls to the switch 110 for processing. The switch 110 in this embodiment includes a central processing unit (CPU) 115, a memory 116, at least one interworking function (IWF) 117, and a system database 118. The CPU 115 may be a microprocessor, an application-specific integrated circuit (ASIC) or other type of digital data processor, as well as various portions or combination of such elements. The memory 116 may be a random access memory (RAM), a read-only memory (ROM) or combinations of these and other types of electronic memory devices.

The IWF 117 is used to provide necessary format conversions pertaining to signaling and transport, in a known manner. The IWF 117 may in other embodiments be incorporated into other elements of switch 110, such as the CPU 115 and memory 116. The system database 118 may be used to store, e.g., feature assignments to particular feature buttons, directory number assignments to corresponding call appearances or direct facility termination keys, access restrictions, and other known administrative information regarding the configuration of the system 100, as well as other types of information.

The switch 110 in this example further includes four port cards 120A, 120B, 120C and 120D. Port card 120A is coupled to a wireless base station 121 which communicates with a first wireless terminal (WT) 122 designated WT1 and a second wireless terminal 123 designated WT2. The terminal WT1 may be a mobile telephone, and the terminal WT2 may be a wireless deskset. Port card 120B is connected to a broadband wireless base station, e.g., a National Information Infrastructure (NII) wireless base station 124, which communicates with a wireless personal computer (WPC) 125. Port card 120C is connected to a wired deskset (DS) 126. Port card 120D is connected to an advanced terminal (AT) 127, which may be, for example, a video telephone operating in accordance with the H.320 standard. It should be noted that the switch 110 may include additional port cards, and may be connected to other types and arrangements of user terminals. The switch 110 is also connected to an administrator terminal 128 which may be used to program the operation of the switch 110 during a system administration, e.g., an initial set-up and configuration of the system or a subsequent system-level or user-level reconfiguration.

The system 100 of FIG. 1 includes an adjunct feature server 129. The adjunct feature server 129 may be directly connected to the switch 110 or connected thereto over a network or other suitable transport medium. The adjunct feature server 129 may be used, e.g., to implement various aspects of a symbol-based control technique in accordance with the invention. Although shown as separate from the switch in the embodiment of FIG. 1, an adjunct such as adjunct feature server 129 is considered to fall within the general definition of the term "switch" as given previously. Such an adjunct may be physically incorporated within the switch in other embodiments of the invention, and may be partially or completely implemented using other switch elements such as CPU 115 and memory 116.

The present invention in the illustrative embodiment allows an existing wired terminal protocol, such as a protocol used to control wired deskset terminal 126 in the system of FIG. 1, to be extended in a bandwidth-efficient manner to support wireless terminals, such as the mobile wireless terminal 122. More particularly, the invention allows the wireless terminal 122 to operate using an existing wired terminal protocol of system 100 but at a substantially reduced bandwidth consumption and with a high degree of optimization for the specific characteristics of the wireless terminal. A typical wired terminal protocol supports a large number of commands, e.g., for controlling a deskset or other type of multifunction business telephone. In the illustrative embodiment to be described below, a set of command symbols are created to replace the conventional multi-octet, field-based, bit-oriented command structure of the existing wired terminal protocol. A mechanism is defined for creating the command symbols, e.g., on the wireless port card in the serving switch, and for decoding and executing them in the served wireless terminal. Note that in the process, individual bits lose their assigned identity in the wired terminal protocol to that of the generated command symbol, and that overall bit utilization is reduced while performing equivalent command functions. The invention is illustrated herein by way of example using the downlink, i.e., switch-to-terminal, symbol generation procedure. The terminal-to-switch procedure can be implemented in a similar manner, as will be apparent to those skilled in the art.

Figure 2:
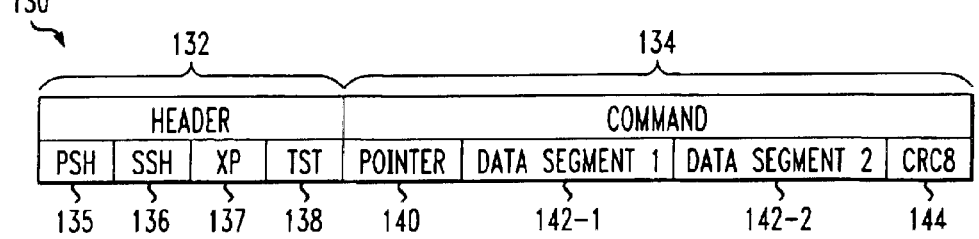
FIG. 2 shows a wired terminal protocol packet format that may be utilized to support a wireless terminal using the techniques of the invention.

FIG. 2 illustrates a standard wired terminal protocol which serves as the basis for the symbol generator in the illustrative embodiment. In accordance with the protocol, a given fixed-length 24-bit packet 130 includes a header field 132 and a command portion 134. The header field 132 contains four bits of control information, including a primary switchhook (PSH) state bit 135, a secondary switchhook (SSH) state bit 136 (bit B2), an extended protocol (XP) indicator bit 137, and a test bit (TST) 138. The PSH state bit 135 indicates the state of the wired terminal handset-related switchhook, the SSH state bit 136 indicates the state of the wired terminal intercom service, the XP indicator bit 137 is used to support datagrams via an adjunct interface of the wired terminal, and the TST bit 138 is used to indicate to the serving switch that the wired terminal has entered a user-commanded self-test mode. The command portion 134 in this embodiment contains a 4-bit command pointer field 140, which indicates the type or category of command the terminal is to execute, two 4-bit command data segments 142-1 and 142-2 which specify the particular command within a given category, and an 8-bit cyclic redundancy code (CRC) field 144 to ensure command integrity. The command pointer 140 generally addresses a particular terminal element, and pointers are available for categories such as, e.g., audio path control, alerter control, user interface condition control, and display control.

Figure 3:
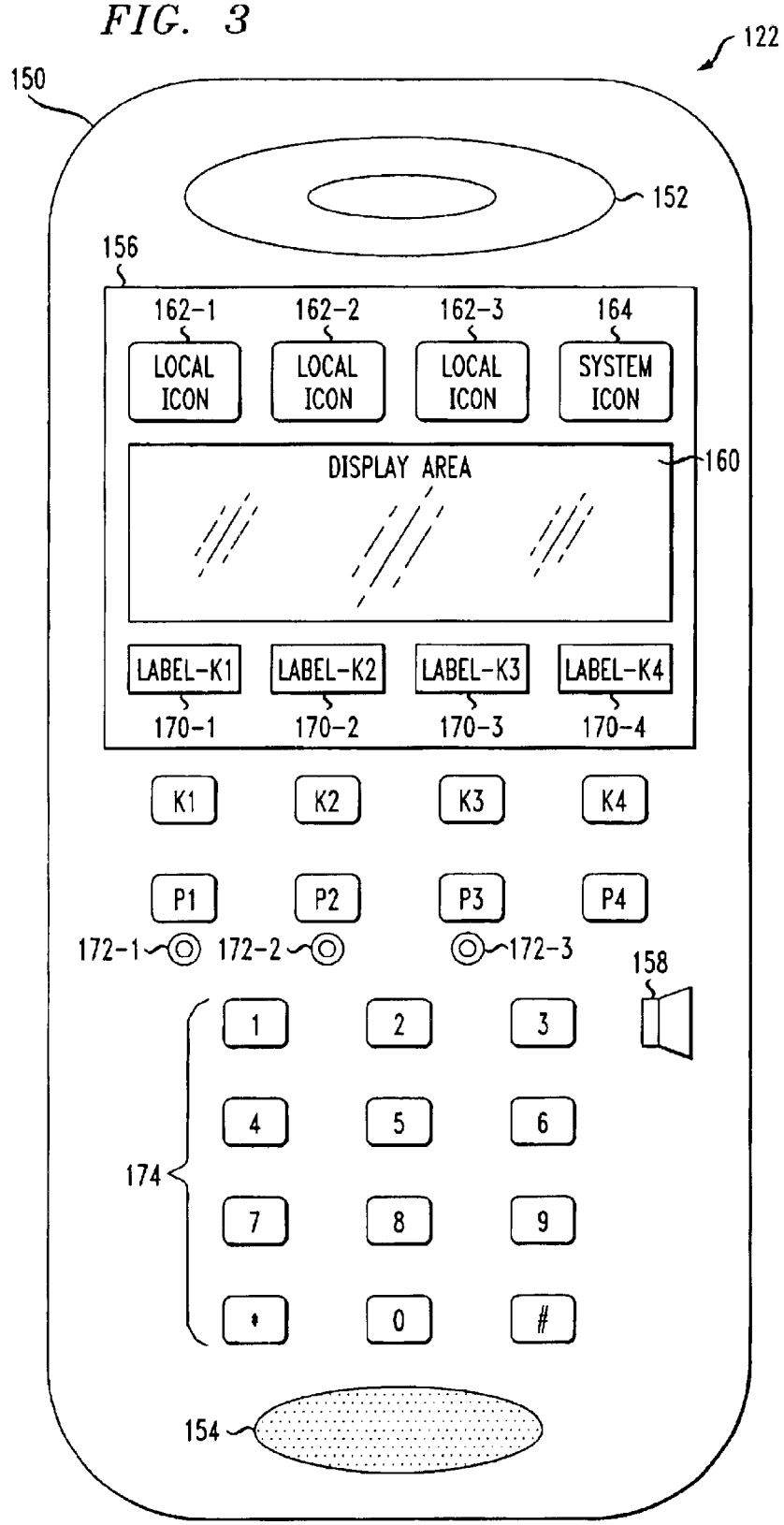
FIG. 3 shows an illustrative embodiment of a wireless terminal configured in accordance with the invention.

FIG. 3 shows a wireless terminal 122 to which the above-described wired terminal protocol will be applied in the illustrative embodiment of the invention. The terminal 122 includes a housing 150 with a speaker 152, a microphone 154, a display 156 and an audio alerter 158. The display 156, which may be an LCD display or other suitable type of display, includes a display area 160, a set of local icons 162-1, 162-2 and 162-3, a system icon 164, and a set of SLK labels 170-1, 170-2, 170-3 and 1704 which indicate the functions associated with SLKs K1, K2, K3 and K4, respectively. A given physical SLK can have multiple function assignments which vary in accordance with the feature labels, based on the symbol-based control techniques of the invention to be described in greater detail below.

The local icons 162-1, 162-2 and 162-3 indicate locally-generated status information associated with the wireless terminal, e.g., battery charge remaining, signal strength, etc. The system icon 164 conveys system information supplied to the terminal by the switch. Alternative embodiments could include multiple switch-driven system icons. The wireless terminal 122 further includes buttons P1, P2, P3 and P4, LED indicators 172-1, 172-2 and 172-3, and a conventional set of touch-tone dialpad buttons 174. It should be emphasized that the configuration of wireless terminal 122 as shown in FIG. 3 is for purposes of illustration only, and should not be construed as limiting the invention to any particular type of wireless terminal.

The command symbol generation procedure in the illustrative embodiment of the invention is as follows. First, the command space is resized according to the requirements of the wireless terminal user interface application, e.g., the wireless terminal of FIG. 3. This involves determining all command elements which are not of use to the button and indicator fields available on the wireless terminal 122. These fields are relatively small as compared to the more complex wired terminal for which the FIG. 2 protocol is designed. FIG. 4 shows a table illustrating the resizing process. Bits B1 and B2 in the FIG. 4 table correspond to the PSH bit 135 and TST bit 138, respectively, in the FIG. 2 packet format. Bits B3 and B4 correspond to the two bits of the command pointer 140. Bits B5 through B8 may correspond to one of the four-bit data segments 142-1 or 142-2. All entries in the FIG. 4 table that are not applicable to the function of the wireless terminal are shaded. For example, the maintenance test operation is not permitted when the wireless terminal is active in a call. Therefore, all command entries which have the wireless terminal both "off-hook" on the primary switchhook and in test mode are shaded. Similar command field reductions are made against other command space entries in the wired terminal protocol. Also, bits corresponding to functions which are irrelevant to the wireless terminal, e.g. the SSH bit 136 for an intercom function and the XP bit 137 for a datagram service, are eliminated from the wireless terminal command space, and are thus not shown in the FIG. 4 table.

FIGS. 5A through 5G show tables illustrating the resulting field-based commands and associated parameters of the wireless terminal, after the above-described resizing of the command space. FIGS. 5A and 5B show the interpretation of bits B1 and B2, respectively, which as previously noted correspond to the PSH and TST bits, respectively. FIG. 5C shows the interpretation of the pointer bits B3 and B4. These bits specify a particular command category in the wireless terminal, and include visual indicator, audio alerter, display predetermined string, and display data string command categories. FIGS. 5D through 5G illustrate the specific commands for each of these command categories.

FIG. 5D shows that the visual indicator includes a two-bit indicator ID, one for each of the system icon 164 and the three LEDs 172-1, 172-2 and 172-3. For the system icon 164, the available attributes are on, off, and reverse video. For the LEDs, the available attributes are on, off, flash and fast blink. FIG. 5E shows that the audio alerter 158 supports eight patterns: no alert, alert patterns 1 to 5, call waiting alert, and test alert pattern for maintenance. When the wireless terminal is active in a call, the audio alerter 158 can have only two patterns: no alert, or call waiting alert. FIG. 5F indicates that the pre-determined display string commands include eight system-defined display strings, and three supplementary display commands: clear display, load display string, and display test pattern. When the system initiates the test operation at the wireless terminal, the audio alerter has a dedicated alerting pattern for test, and the display has the display test string. The system will not send the display data to the display during the test operation. With regard to the predetermined sting display functions of FIG. 5F, system-defined display strings can be downloaded to the wireless terminal via the "load string" command as follows:

load string string N string character 1 (upper 4-bit)

string character 1 (lower 4-bit)

string character 2 and so on.

string character NULL string character NULL (as terminator)

The data string display functions of FIG. 5G may be used to display multiple characters, e.g., a telephone number, on the display of the wireless terminal. A telephone number may thus be supplied from the system to the wireless terminal for display.

The tables of FIGS. 5A through 5G represent the essential and sufficient functions required to control the wireless terminal 122 of FIG. 3 using the wired terminal protocol of FIG. 2. These tabulations demonstrate the sufficiency of the reduced command set, and the command points available to drive the wireless terminal in a fashion substantially equivalent to, e.g., that with which the system users are familiar based on their wired terminals. As shown in FIG. 4, the applicable combinations of commands for this wireless terminal can be reduced to a total of only 103 combinations, each corresponding to a unique symbol.

In the next step of the symbol generation process, the reduced command field is cross-coded, as illustrated in the diagram of FIG. 4. In the illustrative embodiment, bits B5–B8 are orthogonalized against the balance of the frame structure, i.e., bits B1–B4. Particular values of bits B5–B8 are assigned to rows of the FIG. 4 table, and particular values of bits B1–B4 to columns as shown. Other orthogonalization arrangements may also be used, and yield similar results. As the final step in the symbol generation process, command symbol values are assigned, in this case serially and sequentially, to the valid, i.e., non-shaded, entries in the table of FIG. 4. In other words, symbol numbers are assigned starting with the valid entry in the right-most and upper-most position in the table, and subsequent valid entries are numbered serially and sequentially, i.e., in order continuing down the first column, then from the upper-most valid entry in the next column down that column, and so on. This results in 103 assigned symbols, labeled as shown in FIG. 4. Other techniques may be used to assign symbol numbers to valid entries in the command space, including random assignment techniques.

Note that the command space in this illustrative embodiment has been reduced from a 24 bit structure, with $2^{24}$ symbol possibilities, to one which can be represented using less than $2^7$ symbols, and thus only 7 bits. As is apparent from FIG. 4, each of the symbols corresponds to a particular entry in the table, and thus a particular combination of commands. In general, the total number of valid entries in the reduced command space is less than or equal to $2^N$, where N is the number of bits in a given symbol. A parity bit may be added in the illustrative embodiment as an additional integrity check, and to preserve an octet-based format, which is assumed by most commercially available hardware components. The eighth bit in the illustrative embodiment may alternatively be used to expand the symbol count if mandated by system requirements. The need for an integrity check generally depends on the particular medium used in a given application. For example, in the wireless domain, primary integrity checks may be executed by the Media Access Control (MAC) function, such that the CRC is not needed. Other applications could utilize a shortened CRC or other type of integrity check.

The symbol generation process in the illustrative embodiment may be implemented in whole or in part in a port card in the serving switch, e.g., in port card 120A associated with wireless base station 121 in system 100 of FIG. 1, elsewhere in the enterprise switch 110, e.g., using CPU 115 and memory 116, in the wireless terminal 122, in the adjunct feature server 129, or in various combinations of these and other system elements. Other suitable arrangements of hardware and/or software may be used to implement the symbol generation process in accordance with the invention. The wireless terminal 122 includes suitable circuitry for receiving symbols, decoding a given received symbol, and executing the corresponding combination of commands uniquely specified by that symbol. Such receiving, decoding and execution circuitry may include, e.g., a conventional processor and memory, and may be implemented in a straightforward manner.

The above-described illustrative embodiment of the invention significantly reduces the command field associated with supporting the operation of a wireless terminal using an existing wired terminal protocol. This results in a proportional bandwidth consumption reduction when communicating over wireless communication channels, thereby preserving this scarce resource. The fill functionality of the system, as expressed by the wired terminal protocol, is made available to the wireless terminal, to the extent implementable in that terminal. In addition, there is no need to subject the command symbols to bitwise encryption, since their field mapping conventions in accordance with the wired terminal protocol are eliminated during the symbol generation process of the invention. As previously noted, the above-described embodiment of the invention is intended to be illustrative only. For example, the invention is not restricted to use in applications in which a wired terminal protocol is supported by a wireless terminal, as in the illustrative embodiment, but is instead more broadly applicable to any application in which an existing terminal protocol is used to support a terminal which utilizes less than the full available command space of the terminal protocol. In addition, although illustrated for downlink, i.e., switch-to-terminal communication, the invention can also be used for uplink, i.e., terminal-to-switch, communications. These and numerous other alternative embodiments within the scope of the following claims will be apparent to those skilled in the art.

What is claimed is:

1. A method of controlling a terminal in a communication system, the method comprising the steps of:

generating a command symbol representative of a plurality of commands in accordance with a terminal protocol supported by a switch of the system; and transmitting the command symbol to a terminal having a valid command space which is less than a full command space of the terminal protocol, wherein the terminal decodes the symbol and executes the corresponding plurality of commands.

2. The method of claim 1 wherein the terminal protocol is a wired terminal protocol, and the terminal is a wireless terminal.

3. The method of claim 2 further including the steps of:

resizing a command space associated with the wired terminal protocol to generate a reduced command space suitable for use with the wireless terminal;

generating a representation in which a first portion of the reduced command space is correlated with a second portion of the reduced command space; and assigning command symbols to valid entries in the representation, such that a given one of the command symbols uniquely identifies a particular set of commands in the reduced command space.

4. The method of claim 2 wherein the wired terminal protocol utilizes a field-based fixed-length packet format including a header portion and a command portion.

5. The method of claim 4 wherein the header portion includes at least one of a primary switchhook indicator, a secondary switchhook indicator, an extended protocol indicator and a test indicator.

6. The method of claim 4 wherein the command portion includes a command pointer identifying a category of commands and at least one command data segment identifying a particular command in a given one of the categories of commands.

7. The method of claim 5 wherein a given one of the command symbols specifies commands associated with at least the primary switchhook and the test indicator.

8. The method of claim 6 wherein a given one of the command symbols specifies commands associated with at least a portion of the command pointer and the command data segment.

9. The method of claim 3 wherein the step of generating a representation includes forming a tabular representation in which specific values of bits in the first portion of the reduced command space correspond to columns, and in which specific values of bits in the second portion of the reduced command space correspond to rows.

10. The method of claim 9 wherein the bits in the first portion of the reduced command space include at least one bit for each of a primary switchhook, a test indicator, and a command pointer.

11. The method of claim 9 wherein the bits in the second portion of the reduced command space include a plurality of command data segment bits.

12. An apparatus for controlling a terminal in a communication system, comprising:
   a memory, associated with a switch of the system, for storing a set of command symbols, wherein each of at least a subset of the command symbols is representative of a plurality of commands in accordance with a terminal protocol supported by the switch; and
   a processor coupled to the memory and operative to direct the transmission of a particular one of the command symbols to a terminal having a valid command space which is less than a full command space of the terminal protocol, wherein the terminal decodes the symbol and executes the corresponding plurality of commands.

13. The apparatus of claim 12 wherein the terminal protocol is a wired terminal protocol, and the terminal is a wireless terminal.

14. The apparatus of claim 13 wherein the set of command symbols is generated by resizing a command space associated with the wired terminal protocol to generate a reduced command space suitable for use with the wireless terminal, generating a representation in which a first portion of the reduced command space is correlated with a second portion of the reduced command space, and assigning command symbols to valid entries in the representation, such that a given one of the command symbols uniquely identifies a particular set of commands in the reduced command space.

15. The apparatus of claim 13 wherein the wired terminal protocol utilizes a field-based fixed-length packet format including a header portion and a command portion.

16. The apparatus of claim 15 wherein the header portion includes at least one of a primary switchhook indicator, a secondary switchhook indicator, an extended protocol indicator and a test indicator.

17. The apparatus of claim 15 wherein the command portion includes a command pointer identifying a category of commands and at least one command data segment identifying a particular command in a given one of the categories of commands.

18. The apparatus of claim 16 wherein a given one of the command symbols specifies commands associated with at least the primary switchhook and the test indicator.

19. The apparatus of claim 17 wherein a given one of the command symbols specifies commands associated with at least a portion of the command pointer and the command data segment.

20. The apparatus of claim 14 wherein the representation comprises a tabular representation in which specific values of bits in the first portion of the reduced command space correspond to columns, and in which specific values of bits in the second portion of the reduced command space corresponding to rows.

21. The apparatus of claim 20 wherein the bits in the first portion of the reduced command space include at least one bit for each of a primary switchhook, a test indicator, and a command pointer.

22. The apparatus of claim 20 wherein the bits in the second portion of the reduced command space include a plurality of command data segment bits.

23. The apparatus of claim 13 wherein the processor comprises a central processing unit of the switch.

24. The apparatus of claim 13 wherein at least one of the memory and the processor are associated with a port card in the switch of the system.

25. An apparatus comprising:
   a system terminal operative to receive command symbols from a system switch, each of at least a subset of the command symbols being representative of a plurality of commands in accordance with a terminal protocol supported by the switch, wherein the terminal has a valid command space which is less than a full command space of the terminal protocol, and wherein the terminal decodes a given one of the symbols and executes the corresponding plurality of commands.

26. An article of manufacture comprising:
   a machine-readable storage medium storing one or more programs for implementing a method of controlling a terminal in a communication system, wherein the one or more programs when executed implement the steps of:
   generating command symbols, each of at least a subset of the command symbols representative of a plurality of commands in accordance with a terminal protocol supported by a switch of the system; and
   directing a terminal having a valid command space which is less than a full command space of the terminal protocol, via a given one of the symbols, to execute the corresponding plurality of commands.

* * * * *